United States Patent
Bedsole

[15] 3,644,124
[45] Feb. 22, 1972

[54] METHOD OF COOKING AND IMPORTING NATURAL BARBECUE FLAVOR TO PORK MEAT

[72] Inventor: Raymond A. Bedsole, 202 West Hudson Street, Fayetteville, N.C. 28306

[22] Filed: Jan. 7, 1970

[21] Appl. No.: 1,194

[52] U.S. Cl. ................................. 99/107, 99/229, 99/260
[51] Int. Cl. ................................. A22c 18/00, A23b 1/04
[58] Field of Search ............... 99/1, 107, 229, 260, 324, 340, 99/446

[56] References Cited

UNITED STATES PATENTS

| 2,839,409 | 6/1958 | Matlen | 99/107 |
| 3,527,154 | 9/1970 | Shaper et al. | 99/446 X |
| 3,561,348 | 2/1971 | Weir | 99/446 X |

*Primary Examiner*—Hyman Lord
*Attorney*—John G. Mills, III

[57] ABSTRACT

In abstract, a preferred embodiment of this invention is a barbecue type cooking process and device which uses an incline heat conductive drip plate having a controlled temperature to produce a pleasing barbecue flavor and aroma in cooked meats without necessitating the use of wood coals and other artificial flavoring means.

1 Claims, 10 Drawing Figures

INVENTOR.
RAYMOND A. BEDSOLE

INVENTOR.
RAYMOND A. BEDSOLE
BY
ATTORNEY

METHOD OF COOKING AND IMPORTING NATURAL BARBECUE FLAVOR TO PORK MEAT

This invention relates to cooking devices and more particularly to cooking devices used in the barbecuing of meats and other edibles.

The barbecuing of meats has over the years been accomplished through the age old process of placing the meat to be cooked on racks below which live coals are spread. Even today this method of cooking is used, as for example, in the barbecuing of beef in the south central and western parts of the United States and in the barbecuing of pork in the southeastern part of the United States.

The art of barbecuing meat such as pork and beef as presently practiced is accomplished by spreading out the raw meat on iron racks approximately 16 to 18 inches above a spread bed of live coals. Sheets of light metal are then placed over the racks and at the sides thereof to form an oven type enclosure. The meat is then cooked between 10 and 12 hours depending upon the size thereof, thick pieces such as hams taking a longer time than rib or middling portions. Periodically during the 10 to 12 hour cooking period, the metal sheets must be removed and additional live coals placed under the meat to replace the coals which have burned out. This process of constantly replenishing burned out coals give an up and down cooking temperature fluctuation which makes control of the cooking cycle difficult at best.

As the meat is cooked in the manner hereinabove described, the juices drip from the meat and are vaporized as they strike the hot coals. The smoke and fumes emitted from this burning and vaporization of the juices surrounds the meat to give it a natural barbecue flavor and then boils out into the cooking room. Although these rooms are generally well ventilated, the smoke is very unpleasant to the personnel transferring the coals from the drop pit below a hardwood fire to replace burned out coals beneath the meat.

It is, of course, the gaseous smokelike fumes that give the meat the barbecued flavor which is the reason for cooking the meat in the manner hereinabove described. Because of the extremely long cooking time required coupled with the almost constant coal and fire tending necessary, the method of barbecuing meat as described is become extremely expensive because of the difficulty in obtaining labor to work in such hot, irritatingly smoky surroundings. Also since all of the juices from the meat are burned off by live coals, cooking in this manner is becoming more and more restrictive because of air pollution rules and regulations controlling emission of smoke into the atmosphere.

Many people enjoy good "pit-cooked" barbecue, particularly pig barbecue which has been either sliced or chopped into eating size portions after cooking. To meet the demands of this market at a competitive price and yet still maintain taste quality, Applicant has done considerable research and study into the above mentioned problems. From this, he has developed a barbecue cooker that allows enough of the juices dripping from the cooking meat to be converted into gaseous fumes to give the meat a barbecued taste while at the same time removing the excessive juices which heretofore have caused the larger amounts of bellowing smoke to be emitted from the cooking pit or area. This invention also allows cooking tie to be reduced by about half of that required by the prior art methods. This coker requires a very minimum of manual regulation and completely eliminates the shoveling of hot coals from the fire area to the cooking area. Additionally, it allows the meat to be cooked while retaining more of its natural moisture or juices and it allows for complete control of the smoke emitted into the atmosphere during the cooking process. Due to its simplicity in breakdown and assembly, the cooker can be entirely dismantled in a matter of minutes for steam cleaning which is required in many instances to meet Government inspection requirements. The present invention also allows the exact flavor desired to be achieved with excess juices being collected and removed from the system for further processing or for disposal.

It is an object therefore of the present invention to provide a controlled, enclosed cooking device which imparts an open pit barbecued taste to meats cooked therein.

Another object of the present invention is to provide a meat cooking device which eliminates the hazard of fire from ignited grease and grease fumes.

Another object of the present invention is to provide a cooker for barbecued meats which allows the maximum amount of natural juices to remain in the meat and yet greatly reduces the time required for cooking.

A further object of the present invention is to provide a barbecue cooking means which is automatically controlled for proper cooking temperature.

Another object of the present invention is to provide a cooking means with means to control the barbecuing smokelike fumes within the cooking chamber and also to control the emission of such smoke into the ambient air.

Another object of the present invention is to provide a cooking means for preparing barbecued meat with means to control the barbecue taste created by the vaporization of part of the juices dripping from such meat.

An additional object of the present invention is to provide a barbecue type cooking device which is readily cleanable.

A further object of the present invention is to provide a cooking means which is readily dismantleable and assembleable to aid in the cleaning of the various parts thereof.

A further object of the present invention is to provide a barbecue cooking means composed of a plurality of interconnecting panels of the insulated core type.

An even further object of the present invention is to provide a barbecue cooking method including heating of the meat at a relatively low temperature for approximately one-half hour until juices began to drip from such meat, increasing the temperature to between 275° F. and 300° F., cooking the meat at this temperature between 5 and 7 hours depending on the thickness of the meat, and controlling the amount of vaporized smokelike fumes emitted from the cooking chamber thereby controlling the taste of the final cooked product.

Another object of the present invention is to provide a barbecue cooking means including a sloped drip plate below the cooking meat and means to heat such plate to an adequately high temperature to vaporize part of the juices dripping from the meat without causing the same to burn.

Another object of the present invention is to provide, in a barbecue cooking device, means to remove excessive juices which drip from the product being cooked.

Another object of the present invention is to provide a barbecue cooking device which can be used in commercial barbecue cooking operations as well as small scale home use.

Other objects and advantages of the present invention will become apparent and obvious from a study of the following description and the accompanying drawings which are merely illustrative of the present invention.

Figure 1:
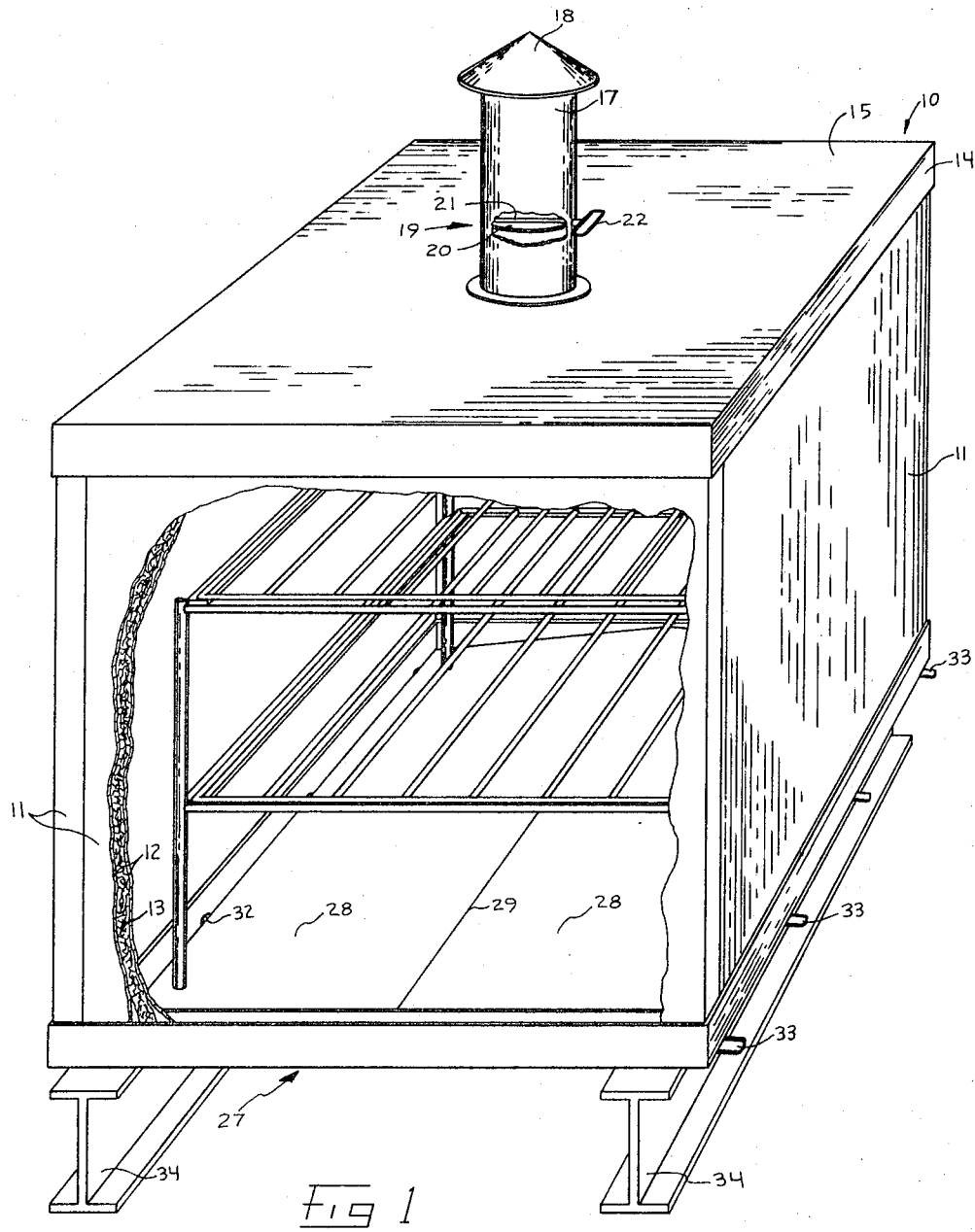
FIG. 1 is cutaway perspective showing a preferred embodiment of the barbecue cooker of the present invention.
Figure 2:
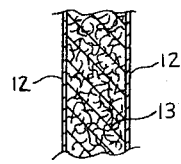
FIG. 2 shows a typical cross section through the insulated panels forming the enclosure of the present invention.

With further reference to the drawings, the cooker indicated generally at 10 is formed from a plurality of overlapping side panels 11. Each of these panels is formed of thin gauged metal exteriors 12, such as aluminum, with a fire-resistant insulating core 13, such as fiberglas.

The upper portion of the side panels 11 are held together and in place by the skirt portion or flange 14 of the insulated top panel 15.

A opening 16 communicated between the interior and exterior of top panel 15. Secured about the periphery of opening 16 is an exhaust flue or pipe 17. To the upper portion of this flue is attached a cap or cover 18. If desired, of course, this could be removed and the flue extended through the wall of the building (not shown) and into the exterior atmosphere.

To control the amount of smokelike fumes emitted from the cooker, a damper indicated generally at 19 is provided. This damper includes a butterfly type valve 20 fixedly secured to shaft 21 which terminates at one end in an exterior control handle 22.

The base drip plate indicated generally at 27 is preferably formed from a ferrous metal such as cast iron or sheet steel and is so constructed as to form two sloping inclines 28 extending slopingly downwardly from a peak or ridge 29. Around the periphery of plate 27 is a lip or upwardly extending flange 30. A side engaging and supporting bracket or flange 31 extends outwardly and upwardly from lip 30 to insertingly engage and mount said side panels 11.

A plurality of small openings 32 extend though the peripheral flange 30 at a point adjacent the lower edge of the sloping inclines 28. Drip spouts 33 are fixedly secured to such flange below lock opening so that juices dripping from the meat being cooked will by gravity drain out of the cooker 10 and thus be removed therefrom.

To support the entire cooking enclosure mounted on and above the base drip plate 27 may be a pair of I-beams such as that shown at 34. It is to understood, of course, that any other suitable means such as legs, stacked bricks, or the lie could be as easily used.

A rack support frame indicated generally at 35 is provided which is of such a size that it will sit on the base drip plate 27 and be disposed within the interior of the cooker 10. This rack is composed of a plurality of legs 36 which are held in relative fixed relation to each other by a multiplicity of cross members 37; matching pairs of which are adapted to support meat racks 38. At least part of the cross members 37 are adjustable vertically so that the space between the racks may be adjusted as well as the height of the lower rack above drip plate 27. Provision can be provided for two or more racks depending on the type and size of meat being cooked and the cooker used.

A heat source indicated generally at 41 is provided below and juxtaposed to drip plate 27. This source can be either of the flame type, such as gas or oil burners and electrically operated means, or any other heat source desirable. Due to its instantaneous availability at full temperature, the flame-type heat sources appear to be more desirable although these are not specifically specified to the exclusion of other sources. Whatever heat source used, the ferrous metal of the drip plate will heat relatively evenly without extreme hot and cold spots. This is of definite advantage in even disbursement of heat connections within the chamber formed by the confines of the various parts of the cooker 10.

Although the openings 32, which are periodically spaced along each side of the drip plate 27, are relatively small, they serve the dual purpose of allowing juices cooked out of the meat to escape from the interior of the cooker and also allow air to enter the interior of the cooker in the lower portion thereof so that a proper draft may be formed to cause proper draw of flue 17 through its controlling damper 19.

To set up the cooker of the present invention for operation, the base plate 27 is set in a generally horizontal position above any desired heat source. The thermostatic probe 25 is inserted into the area which will be the interior of the cooking chamber and is operatively connected to a standard temperature control unit which controls the operation of the heat source.

Figure 3:
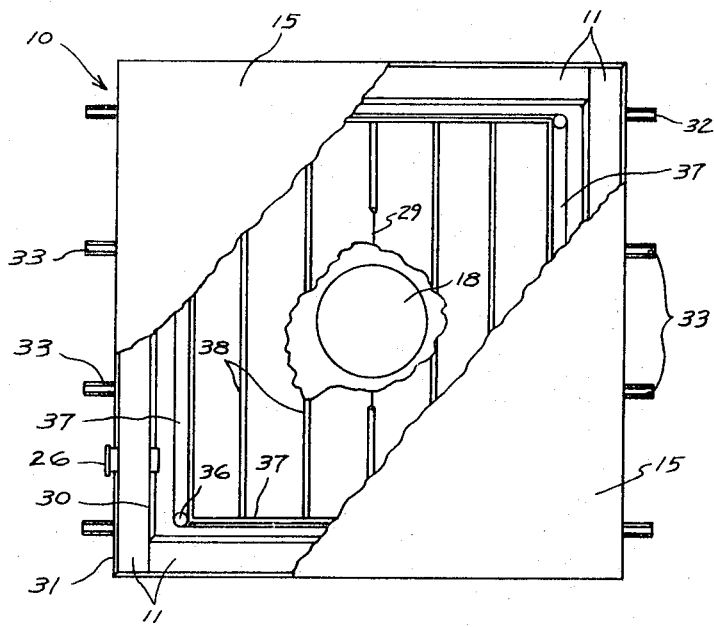
FIG. 3 is cutaway top plan view of the improved cooker.

The panels 11 are inserted in the slot formed by the engaging flange or bracket 31. Since each of these panels is the thickness of a panel shorter than the length of the side of baseplate 27 on which it is mounted, each of these panels overlaps and buttingly engages its adjacent panels, particularly as seen in FIG. 3. This overlapping of the panels adds inherent strength and stability to the cooker without requiring additional fastening or securing means. The top panel with its peripheral flange 14 is capped over the upper edges of panels 11 to form the enclosed cooker. Prior to this capping, however, the rack support frame 35, its associated meat racks 38, ad meat supported thereon are all placed in cooking position above baseplate 27.

As the cooker is set up as hereinabove described, the smoke density sensor can be operatively connected to the damper motivating means and the target light source 24 can be operatively connected to a source of electrical power (not shown). If desirable, of course, an observation window could be formed though one of the side panels 11 and obviously a door could be provided therethrough if this was deemed desirable.

Once the insulated side panels have been assembled and the insulated top portion has been slipped in place along with the racks and the meat supported thereon as described above, the cooking process is ready to start.

The thermostat 39 operatively connected in normal fashion to probe 25 is set to the desired cooking temperature. This thermostat operatively controls heat regulator 40 which in turn controls the fuel to heater 41. The fuel for the heater enters the same through inlet 42 and regulator 40. Although this may indicate either gas or oil fuel, it is, of course, understood that other fuels could be used and also that an electrical heat source could readily be substituted therefor.

During the first few minutes of cooking time, the temperature is held down to between 200° and 225° F. to prevent later burning or scorching of the meat due to the exterior portion having become cooked too soon. As soon as the juices began to drip from the meat, which indicates that the same is beginning to cook internally, the temperature is increased to between 275° and 300° F. This is the cooking temperature used during the remainder of the cooking cycle. The initial low temperature cooking ordinarily takes approximately 30 minutes although the thickness of the meat being cooked is directly proportional to the tie required for this initial stage. In cooking large pieces of meat such as roast, hams, shoulders, and the like, an overall cooking time of between 5 and 7 hours is required.

As the juices drip from the cooking meat onto the metallic drip plate 27, which is heated from a source exterior of the cooker enclosure, a portion of such juices is vaporized thereby creating a smokelike fume which imparts to the meat natural barbecue flavors.

Figure 4:
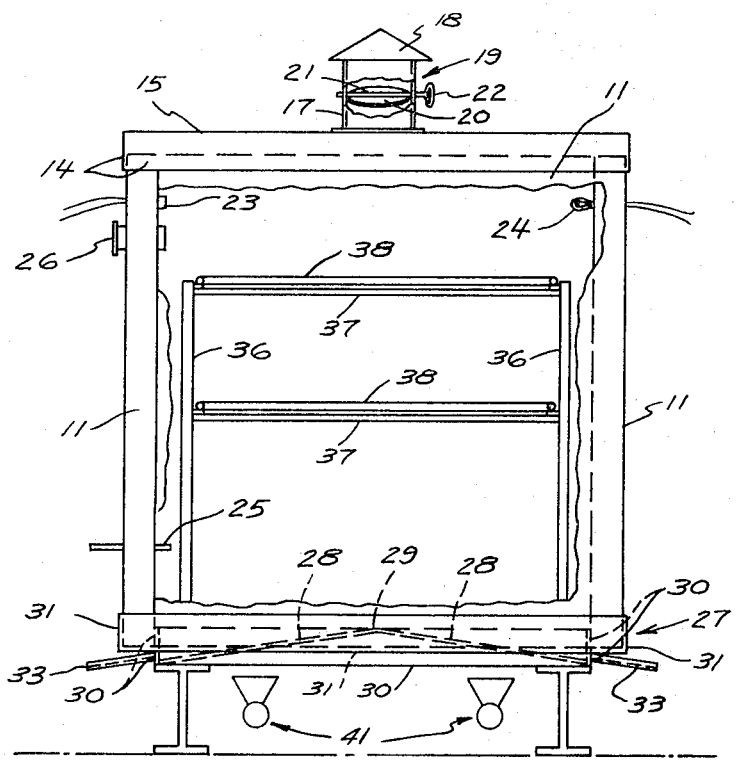
FIG. 4 is an end elevational view thereof.
Figure 5:
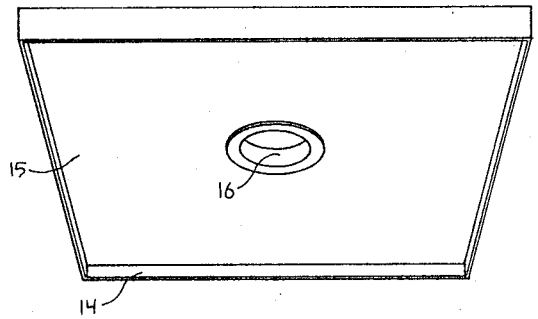
FIG. 5 is a perspective of the lower side of the top portion of the cooker.
Figure 8:
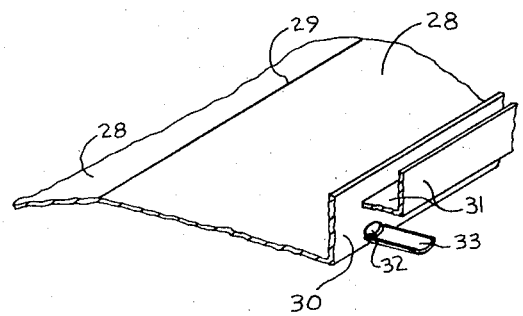
FIG. 8 is a fragmentary section of the inclined drip plate showing the details thereof.
Figure 6:
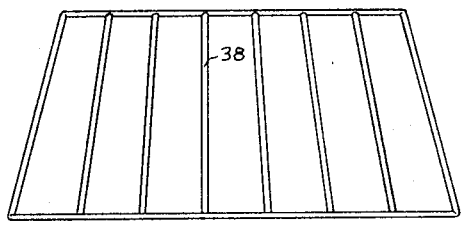
FIG. 6 is a perspective of a typical meat supporting rack.
Figure 9:
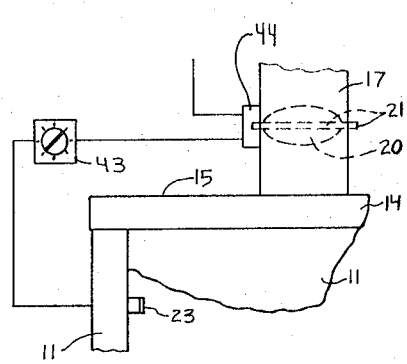
FIG. 9 is the smoke-sensitive automatic damper control means shown in schematic form.
Figure 7:
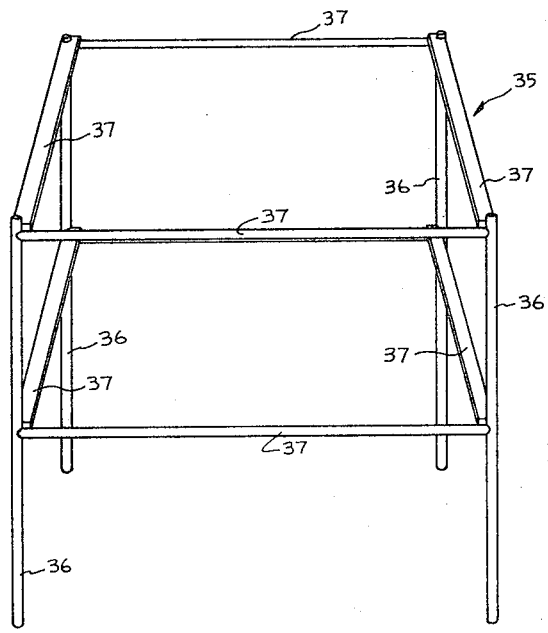
FIG. 7 is a perspective of the rack supported frame.
Figure 10:
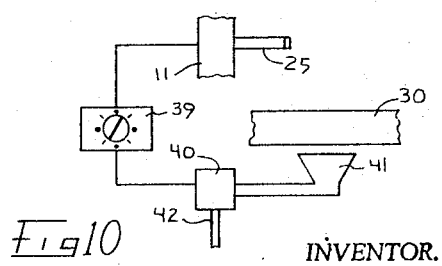
FIG. 10 is the temperature-sensitive automatic heat control means shown in schematic form.

The damper 19 within flue 17 is used to control the amount of residual smoke fumes within the chamber. Either the manual damper shown in FIGS. 1 and 4 can be used to accomplish this regulation of the taste giving fumes or the automatic damper control disclosed in FIG. 9 can be used. With this latter system, the smoke sensor and control 43 is set to the desired density. When the smoke fumes within the chamber reach the preset thickness, photoelectric cell 23 working in conjunction with light source 24 trips control 43 to activate solenoid 44 which automatically opens damper valve 20. When enough of the smoke fumes have been exhausted from the system though flue 17, enough light will penetrate the smoke vapor within the chamber to register on light sensitivity cell 23 which through control 42 will again activate the solenoid to close valve 20. Thus it can be seen that automatic control of the cooking system of the present invention can be maintained by setting the cooking temperature on thermostat 39 and the smoke fume density on the density control 43.

Once the barbecue cooking cycle is completed with the meat properly cooked, the same can be removed from the confines of the cooker. The cooker is then dismantled and the various parts moved to a wash area to be thoroughly cleansed.

Since the insulated side and top panels can be made of aluminum or other light weight metal, they are easily moved from place to place. A conveyor system can be used to move them to and from the cleaning area and it is contemplated that standard steam cleaning and disinfecting procedures would be used. Once all of the various parts of the cooker 10 have been removed, it is a simple matter to cleanse the base drip plate 27 without moving the same. This is desirable due to the weight thereof.

As soon as the plate, the various panels, the racks and rack supports have been cleaned and inspected, the same may be immediately reassembled, which takes only a matter of minutes to accomplish, and the next cooking cycle can be started. Thus it can be seen that not only great savings in noncooking time is made but also labor involved in cleanup is greatly reduced from that required using prior art cooking systems.

Receptacles, troughs or the like can be used in conjunction with drip spouts 33 to catch and hold the unvaporized juices which run off from the incline surfaces 28 during the cooking process. This recovery of unvaporized juices is of double advantage. First it reduces the amount of smokelike fumes produced during the cooking process, and secondly the recovered juices can be used as flavoring for gravies and other products.

From the above, it is obvious that the present invention has the advantage of providing a barbecue cooker requiring a minimum, if any, labor during the cooking process. It also has the advantage of reducing cooking time by approximately 50 percent thus allowing twice as much meat to be cooked during any given period with practical elimination of cooking supervisors. The present invention also has the advantage of allowing the quality and amount of barbecue taste to be accurately controlled. The cooker of the present invention has the additional advantage of allowing cooked meats to retain more of their natural moisture than has heretofore been possible while at the same time recovering a large portion of the juices that are cooked out of such meat. The present invention has the even further advantage of being highly efficient in heat loss, light in weight for ease and handling, easily cleanable, and inexpensive in initial purchase cost and in later maintenance expense.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. The method of cooking and imparting to relatively large pieces of pork meat natural barbecue flavors consisting of: placing the meat to be cooked within a cooking enclosure; heating the interior of said enclosure to a low cooking temperature of between 200° and 225° F. for approximately 30 minutes until natural juices begin to be emitted from said meat; increasing the temperature to between 275° and 300° F.; and cooking said meat at such temperature from between 5 and 7 hours while controlling within said enclosure the amount of smoke fumes created by the vaporization of at least a portion of said emitted juices while permitting the maximum amount of natural juices to remain in the meat whereby a natural barbecue flavor is imparted to the pork meat under said controlled cooking conditions.

* * * * *